(No Model.)

E. F. CAMPBELL, L. C. NOBLE & M. G. HOWE.
NUT LOCK.

No. 301,337.  Patented July 1, 1884.

Witnesses.
Robert Everett
Chas. F. Hyer

Inventors.
Eli F. Campbell
Laroy C. Noble
Milton G. Howe,
By James L. Norris
Atty.

UNITED STATES PATENT OFFICE.

ELI F. CAMPBELL, LAROY C. NOBLE, AND MILTON G. HOWE, OF HOUSTON, TEXAS.

NUT-LOCK.

SPECIFICATION forming part of Letters Patent No. 301,337, dated July 1, 1884.

Application filed March 17, 1884. (No model.)

*To all whom it may concern:*

Be it known that we, ELI F. CAMPBELL, LAROY C. NOBLE, and MILTON G. HOWE, citizens of the United States, residing at Houston, in the county of Harris and State of Texas, have invented new and useful Improvements in Nut-Locks, of which the following is a specification.

The present invention relates to that class of nut-locking washers which are in the form of volute springs, and are fitted on the bolts between the nuts and fish-plate or other objects held by said bolts and nuts.

The object of the invention is to obtain a spring-washer of great stiffness and strength which will permanently retain its elasticity and exert a sufficient friction or resistance between the surface of the spring and nut to positively prevent the turning of the latter.

To this end the invention consists of a volute spring-washer which is formed of a stiff or strong steel plate that is coiled or set up in in an edgewise manner, and is provided with one or more projections or spurs on its top and bottom surfaces, adapted to engage with the under side of the nut and the fish-plate or other object, said spurs or projections being formed on the top and bottom edges of the inner and outer coils of the spring-washer, all as will be hereinafter more fully described, and then set forth in the claim.

Figure 1:
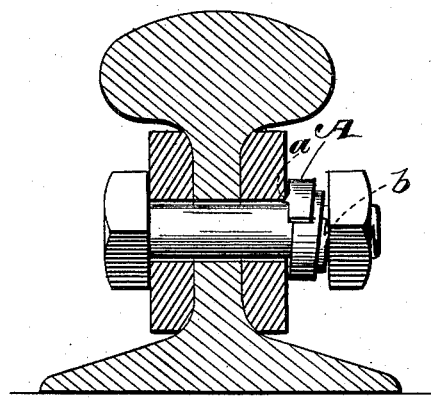
Figure 2:
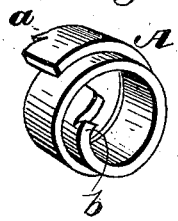
Figure 3:
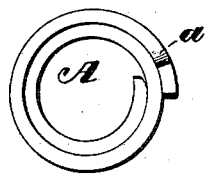

In the drawings, Figure 1 is a transverse section of a rail-joint, showing our volute spring-washer interposed between the nut and fish-plate, said washer having spurs or projections which engage with the under side of the nut and with the fish-plate. Fig. 2 is a perspective view of our spring-washer, and Fig. 3 is a top view of the same.

We construct our volute spring-washer A of a flat steel plate, which is made of a sufficient width and thickness to give the finished washer the desired degree of stiffness and strength. This steel plate is coiled in an edgewise manner upon a suitable mandrel, so as to cause the top and bottom edges of the plate to form the surfaces which are in contact with the nut and the fish-plate of a rail-joint or other object to be secured.

The washer is, by the particular manner in which its convolutions are made to run, given a larger diameter at one end than at the other, and this larger portion is usually the base of the washer, or surface that rests in contact with the fish-plate or other object to be secured.

One or more spurs or projections, $a$, are formed on the top edge of the inner coil or convolution of the washer, and a similar spur or spurs, $b$, are formed on the bottom edge of the outer coil of the washer. These spurs are produced by cutting the metal of the washer with a suitable chisel at a point beyond the ends of the respective coils, and said spurs are so shaped or turned as to point in the direction in which the nut is turned in fitting or screwing it on the bolt.

A single spur will generally answer for insuring a firm engagement between the washer and nut, it being obvious that the spur is caused to be embedded in the under side of the nut when the latter is screwed home, and in this manner the loosening thereof by jars or accidental causes is effectually prevented. The lip on the base of the washer is designed to enter the metal of the fish-plate for locking the washer thereto.

A volute spring-washer made as above described can be easily and cheaply manufactured, and possesses such a degree of elasticity, strength, and rigidity that it will always be in condition to take up the wear caused by the abrasion of the fish-plates or other members of a rail-joint. In this manner the bolts are prevented from rattling, and are always held tight by the action of the spring-washer.

We are aware that a volute conical spring formed of round or square metal wire has heretofore been employed as a nut-locking washer; and we are also aware that a spring-washer has been made so as to form biting-edges which engage the fish-plate, and therefore we do not claim such subject-matter.

What we do claim, however, and desire to secure by Letters Patent, is—

A volute spring-washer consisting of a stiff or strong plate set up or coiled in an edgewise manner, and having one or more projections or spurs formed, respectively, on the top and bottom edges of its inner and outer coils, substantially as described.

In testimony whereof we have hereunto set our hands in the presence of two subscribing witnesses.

ELI F. CAMPBELL.
LAROY C. NOBLE.
MILTON G. HOWE.

Witnesses:
F. F. COLLINS,
ALF. S. DYER.